Dec. 23, 1952 V. BECHTEL 2,622,477
ADJUSTABLE NOSE BRIDGE SUPPORT FOR BIFOCAL SPECTACLES
Filed April 11, 1950 2 SHEETS—SHEET 1
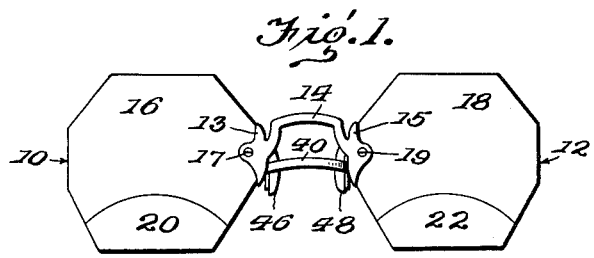
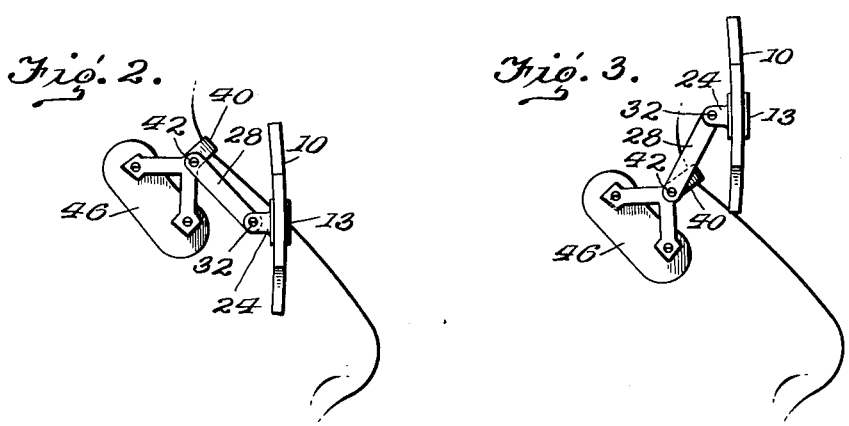
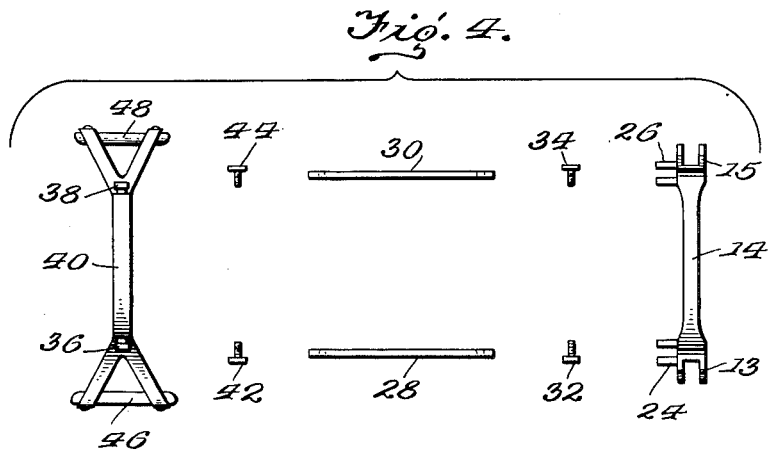
INVENTOR
Victor Bechtel
BY Edward M. Shealy
ATTORNEY Dec. 23, 1952  V. BECHTEL  2,622,477
ADJUSTABLE NOSE BRIDGE SUPPORT FOR BIFOCAL SPECTACLES
Filed April 11, 1950  2 SHEETS—SHEET 2
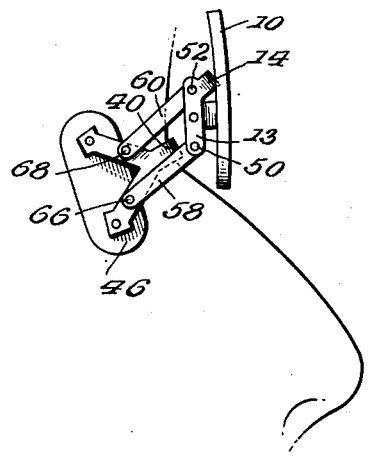
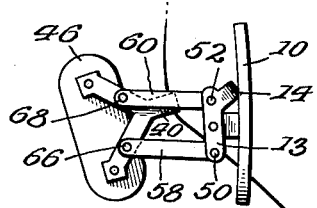
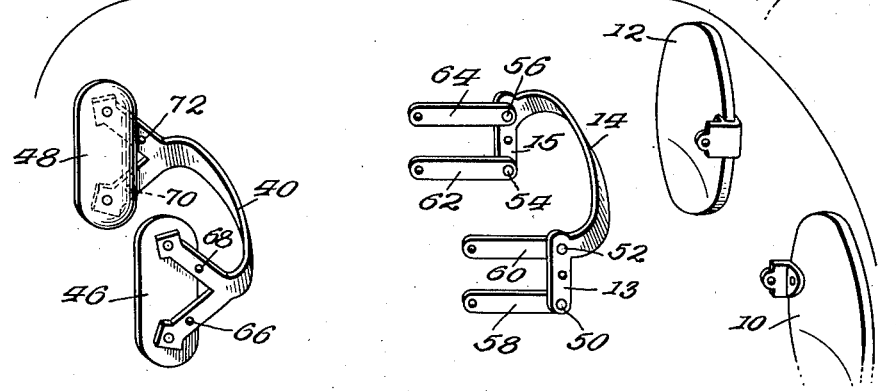
INVENTOR
*Victor Bechtel*
BY *Edward M. Shealy*
ATTORNEY Patented Dec. 23, 1952

2,622,477

UNITED STATES PATENT OFFICE 2,622,477

ADJUSTABLE NOSE BRIDGE SUPPORT FOR BIFOCAL SPECTACLES

Victor Bechtel, Albuquerque, N. Mex.

Application April 11, 1950, Serial No. 155,289

1 Claim. (Cl. 88—43)

The present invention relates to ophthalmic mountings and consists of an improved mounting or support which is a permanent part of the spectacle assembly, for use with bifocal or trifocal lenses and the like.

It is well known among wearers of bifocal or other special lenses that considerable difficulty is experienced in shifting the line of sight from the distance portion of the lens to the reading portion and vice versa. For example, the wearer of bifocal spectacles is caused considerable inconvenience and physical discomfort by tilting the head backwards as heretofore required, to bring the reading or close vision areas of the lenses into position for use under certain conditions. This is because the lenses of bifocal or other special lenses are so made that the inserts or other close reading areas or segments of the lenses are at or near the bottom of the same, so that the line of vision therethrough is somewhat downwardly inclined from the eye, which is the natural or normal angle inasmuch as most reading or other close vision work is done with the reading matter or other observed subject disposed or supported somewhat below the eye level. As a result, the regular bifocal or trifocal spectacles have been found to be unsuited or unsatisfactory for use by musicians in reading music while playing the piano, for hospital patients, invalids, and for many occupational, recreational and other uses where the wearer requires close vision at or near eye level, or higher.

The principal object then of the present invention is to overcome these difficulties and is accomplished primarily by providing an adjustable nosebridge to allow vertical adjustment of the lenses, so that the wearer can instantly adjust the lenses to the most comfortable sight position particularly when using the bifocal or trifocal part of the lens for reading or for close-up work.

Another object of the invention is to provide a device of the character described which is light in weight, simple in construction, is a permanent part of the spectacle assembly, is highly efficient in operation and instantly adjustable, and which will be economical to manufacture and will provide a new field of sales for manufacturers of frames and lenses.

With the above and other objects in view as will appear as the description proceeds, the invention consists in the novel construction, combination and arrangement of parts, as hereinafter more specifically set forth, claimed and shown in the accompanying drawings which form a part of this application for Letters Patent.

In the accompanying drawings I have illustrated several preferred and practical embodiments of my invention, it being understood, however, that the drawings are merely illustrative and that my inventive-concept is susceptible of a wide range of variation and modification without departing from the spirit of my invention or the scope of the appended claims.

In the drawings which accompany and form a part of this specification, and in which like reference numerals are used to designate the same or like parts throughout the several figures:

Fig. 1 is a front elevation of a pair of bifocal spectacles equipped with the adjustable nose bridge of the present invention shown in the close viewing position;

Fig. 2 is a side view showing one form of the linkage of the adjustable nose bridge and the right lens of the spectacle in distant viewing position, upon the nose of the wearer;

Fig. 3 is a side view showing the form of linkage of the adjustable nose bridge shown in Fig. 2, and the right lens of the spectacle in close viewing position, upon the nose of the wearer;

Fig. 4 is an exploded top view of the adjustable nose bridge shown in Figs. 2 and 3;

Fig. 5 is a side view showing another form of linkage of the adjustable nose bridge and the right lens of the spectacle in close viewing position, upon the nose of the wearer;

Fig. 6 is a side view showing the form of linkage of the adjustable nose bridge shown in Fig. 5, and the right lens of the spectacle in distant viewing position, upon the nose of the wearer; and, Fig. 7 is an exploded perspective view of the adjustable nose bridge shown in Figs. 5 and 6.

Referring now in detail to the drawings and first adverting to that form of the invention shown in Figs. 1, 2, 3 and 4, Fig. 1 illustrates conventional bifocal eyeglasses comprising a pair of lens units 10 and 12 interconnected by a conventional type bridge 14 having side members 13 and 15 to which the lenses 10 and 12 are connected by suitable means such as the pins 17 and 19 as is well known to those skilled in the art to which this invention pertains. The lens units 10 and 12 consist of upper or distant viewing lens portions 16 and 18, respectively, and lower or close viewing segment portions 20 and 22, respectively. The spectacles or eyeglasses may have the usual temple connections (not shown) secured at the outer edges of the lenses 10 and 12 to aid in holding the spectacles in the proper location on the face of the wearer.

Two hinge points which have been designated by reference numerals 24 and 26 are carried by the side portions 13 and 15 respectively of the bridge 14 as is shown most clearly in Fig. 4. Two link members 28 and 30 are pivotally connected at one end to the hinge points 24 and 26, respectively, by means of the pins 32 and 34 which may be of either the rivet or screw type, or by any other suitable securing means. The other end of the links 28 and 30 are pivotally secured by means of the pins 42 and 44 to hinge points 36 and 38 which are carried by a fixed nose bridge which has been designated generally by the reference numeral 40. The pins 42 and 44 may be of either the rivet or screw type, or the links 28 and 30 may be pivotally secured to the fixed nose bridge 40 by any other suitable securing means. If desired, suitable stops (not shown) may be used at the hinge points 24 and 26 or the hinge points 36 and 38, or the connecting links 28 and 30 may be so shaped as the hinge ends to act as stops in themselves, so that the movement of the movable nose bridge 14 which carries the lens 10 and 12 may be limited to a suitable amount, which by experimentation has been found to be about 180 degrees of arc, when moving the glasses from the lowered position to the raised position and vice versa. If desired, the fixed nose bridge 40 may have nose pads 46 and 48 suitably secured to it, the nose pads 46 and 48 engaging opposite sides of the wearer's nose and giving added support to the entire assembly and relieving direct pressure on the bridge of the nose. If desired, the fixed bridge 40 may be made from two or more separate bridges (not shown), or from a single wide bridge (not shown), to distribute the pressure on the nose over a wider area, thus giving greater comfort to the wearer than a single bridge would give.

In Figs. 5, 6, and 7 I have shown another preferred and practical embodiment of the principles of my invention. This form of the invention is particularly well suited for wearers who have a low nose arch, while the embodiment just described in connection with Figs. 1, 2, 3 and 4 is particularly well adapted for use by people having a high nose arch. The form of the invention shown in Figs. 5, 6 and 7 makes use of a double connecting link assembly in place of the single connecting link assembly just described in connection with Figs. 1, 2, 3 and 4. The double connecting link assembly shown in Figs. 5, 6 and 7 is essentially the same as that described in connection with Figs. 1, 2, 3 and 4 in that there is a pair of lens units 10 and 12 interconnected by a bridge 14, having side members 13 and 15, which is suitably secured to the bifocal lenses 10 and 12 as is well known to those skilled in the art to which this invention pertains. The bridge 14 has four fixed hinge points 50, 52, 54 and 56 on the upper and lower ends of the sides 13 and 15 as is shown most clearly in Fig. 7. Four links designated by the reference numerals 58, 60, 62 and 64 are pivotally connected at one end to the hinge points 50, 52, 54 and 56 respectively by means of pins which may be of either the rivet or screw type or by any other suitable pivotally securing means. The other ends of the links 58, 60, 62 and 64 are pivotally secured by suitable pivotal securing means to hinge points 66, 68, 70 and 72 which are carried on a fixed nose bridge 40. If desired, suitable stops (not shown) may be used at the hinge points 50, 52, 54 and 56 or 66, 68, 70 and 72, or the connecting links 58, 60, 62 and 64 may be so shaped at the hinge ends to act as stops themselves, so that the movement of the movable nose bridge 14 which carries the lens 10 and 12 may be limited to a suitable amount, which by experimentation has been found to be about 180 degrees of arc, when moving the glasses from the lowered position to the raised position and vice versa. If desired, the fixed nose bridge 40 may have nose pads 46 and 48 suitably secured to it, the nose pads 46 and 48 engaging opposite sides of the wearer's nose and giving added support to the entire assembly and relieving direct pressure on the bridge of the nose. If desired, the fixed bridge 40 may be made from two or more separate bridges (not shown), or from a single wide bridge (not shown), to distribute the pressure on the nose over a wider area, thus giving greater comfort to the wearer than a single bridge would give. It will be understood that while I have illustrated and described my invention with respect to single and double connecting links, that it may be equally well made with triple or even more sets of connecting links without departing from the spirit of my invention or the scope of the appended claim. The new and novel adjustable bridge supports for bifocal glasses of my invention are easily operated. The wearer may easily and quickly raise or lower the spectacle assembly by raising or lowering the movable bridge portion 14 by the use of his thumb and forefinger.

The vertically adjustable nose bridge supports of my invention are an integral and permanent part of the spectacle assembly and will allow the wearers of bifocal and other special spectacles to quickly and easily adjust their glasses to the most comfortable seeing position and permit eye level vision particularly for reading and other close-up work without having to tilt the head back in a strained and uncomfortable position in order to see through the lower, or close viewing portion of the lens and without having to snap on or clamp on a detachable device which must be carried separately and the time taken to put the same on and take it off as prior patents in this art have shown. Both neck and eye strain are relieved by the adjustable nose bridge supports of my invention. The links connecting the adjustable and fixed bridge assemblies may be made in any desired length so that the wearer may have links installed which will give the range of vertical adjustment best suited to that individual. The vertical adjustment feature of my invention will also permit the wearer to wear lenses which are made with larger sized distance viewing portion in the upper lens than are now in use and at the same time the lower close viewing portion of the lens will be so low as to be out of sight when not in the raised position, thus eliminating the double vision hazard which wearers of present-day bifocal lenses encounter when having to look through that portion of the lens where the close viewing portion intersects the distance viewing portion of the lens.

The vertically adjustable nose bridge supports of my invention can be adapted for use with all types and styles of eyeglass frames without the necessity of making any changes in the frames themselves other than the nose piece with the vertically adjustable bridge. People who carry two pairs of glasses, one for reading and one for distant seeing can combine their needs in one pair of glasses with the vertically adjustable bridge supports of my invention; they can adjust the one pair of glasses to their needs by the simple flick of the thumb and forefinger. The adjustable nose bridge assemblies of my invention can be manufactured of metal for metal frames, of plastic for plastic frames, and of either metal or plastic for combination metal and plastic frames. It is to be understood that the forms of my invention herein shown and described are to be taken merely as preferred and practical embodiments of the same and that various changes may be made in the shape, size and arrangement of parts without departing from the spirit of my invention or the scope of the subjoined claim.

Having thus described my invention, what I claim and desire to secure by Letters Patent is:

A mounting for eyeglasses having bifocal lenses comprising a U-shaped bridge piece rigidly connecting said lenses, said bridge piece having an arched central portion and depending, parallel legs, a pair of parallel links pivotally connected to one of said legs at spaced points thereon and a second pair of parallel links pivotally connected to said second leg at spaced points thereon, a second U-shaped nose bridge having its legs depending and a nose pad connected to the outer end of each leg, said second nose bridge being pivotally connected to the outer ends of said parallel links, whereby upon movement of said first bridge piece upwardly the lenses will be supported in upper position for use of the lower reading portions and upon movement of said bridge piece downwardly the lenses will be supported in lowered position for normal use of the main portions, said second nose bridge further providing lateral stiffness of the parallel-link mounting and at the same time permitting the use of separate links for adaption of the mounting to standard frames and easy replacement for repair.

VICTOR BECHTEL.

REFERENCES CITED

The following references are of record in the file of this patent:

UNITED STATES PATENTS

| Number | Name | Date |
|---|---|---|
| 1,102,909 | Hanna | July 7, 1914 |
| 1,396,213 | Jebb | Nov. 8, 1921 |
| 1,978,276 | Nelson | Oct. 23, 1934 |
| 2,093,396 | Williams | Sept. 14, 1937 |
| 2,322,993 | Zell | June 29, 1943 |
| 2,326,846 | Fair | Aug. 17, 1943 |
| 2,350,386 | Christman | June 6, 1944 |
| 2,428,961 | Courney | Oct. 14, 1947 |

FOREIGN PATENTS

| Number | Country | Date |
|---|---|---|
| 665,640 | France | Sept. 20, 1929 |